(12) United States Patent
Magnus

(10) Patent No.: US 8,490,897 B1
(45) Date of Patent: Jul. 23, 2013

(54) GRANULAR SPREADER AND METHOD

(76) Inventor: Loren C. Magnus, Mocksville, NC (US)

( * ) Notice: Subject to any disclaimer, the term of this patent is extended or adjusted under 35 U.S.C. 154(b) by 551 days.

(21) Appl. No.: 12/652,132

(22) Filed: Jan. 5, 2010

(51) Int. Cl.
*A01C 3/06* (2006.01)
*A01C 7/00* (2006.01)
*A01C 15/00* (2006.01)
*E01C 19/20* (2006.01)

(52) U.S. Cl.
USPC ........... 239/661; 239/651; 239/663; 239/656; 239/668; 239/172; 222/242

(58) Field of Classification Search
USPC ................. 239/651, 663, 656, 661, 668, 676, 239/172; 222/242, 203
See application file for complete search history.

(56) References Cited

U.S. PATENT DOCUMENTS

| 2,299,702 | A | * | 10/1942 | Mosel | 220/553 |
| 2,515,269 | A | * | 7/1950 | Shaw | 239/656 |
| 3,600,773 | A | * | 8/1971 | Davis et al. | 425/63 |
| 3,693,890 | A | * | 9/1972 | Torrey | 239/668 |
| 3,923,210 | A | * | 12/1975 | Jackson | 222/494 |
| 5,113,588 | A | * | 5/1992 | Walston | 33/264 |
| 5,354,189 | A | * | 10/1994 | McKinnon | 425/64 |
| 6,024,033 | A | * | 2/2000 | Kinkead et al. | 111/11 |
| 2005/0167533 | A1 | * | 8/2005 | Christy et al. | 239/668 |

OTHER PUBLICATIONS

Warn Works® Winch User Guide, Warn Works® 1700 Utility Winch, Part No. 651700; pp. 1-14.

* cited by examiner

*Primary Examiner* — Len Tran
*Assistant Examiner* — Justin Jonaitis
(74) *Attorney, Agent, or Firm* — Blake P. Hurt

(57) ABSTRACT

A granular spreader having a V-shaped hopper for distribution of oil absorbing granules can be used on race track spills. The granular spreader is towed by a vehicle such as a pickup truck during racing intervals. A rotatable scrubber is affixed to the hopper which can be lowered by an electric winch to contact the race track to urge the deposited granules into the spilled liquid. A pair of flexible flaps are affixed to the bottom of the hopper to assist in distribution and to prevent the fine granule particles from being blown away before contacting the spilled liquids. A cart is also provided for storing the granular spreader during periods of non-use.

11 Claims, 4 Drawing Sheets

GRANULAR SPREADER AND METHOD

FIELD OF THE INVENTION

The invention herein pertains to granular distribution onto a surface and particularly pertains to a granular spreader which can be affixed to and towed by a vehicle for the distribution of oil absorbing granules onto a race track to absorb liquid waste and spills.

DESCRIPTION OF THE PRIOR ART AND OBJECTIVES OF THE INVENTION

Hoppers and distributors for granular materials such as seed, grain, salt, fine clay, oil absorbents, fertilizers and the like have long been used. Small granular distributors are usually hand operated whereas larger spreaders are often manually rolled along the ground or other surface. Bigger spreaders are generally towed by a motorized vehicle such as a tractor or truck. Spreaders can be used on lawns, streets, golf courses, race tracks and the like. Most municipalities employ different types of spreaders to distribute salt on streets and highways during cold, inclement weather.

Golf courses often use spreaders to distribute clay particles on golf greens and fairways during wet or rainy seasons. All of the spreaders generally employ a top loading hopper or container for the clay particles and include a bottom egress for distribution purposes.

Vehicle racing has become an increasingly popular sport in recent years and major races are often televised. Network television time is very expensive per minute and delays or lapses in racing can greatly increase the cost of the event. Accordingly, it is important that the races begin on time and have as few delays as possible. Vehicle wrecks are an integral part of such racing and it is imperative that the wreckage and debris be removed from the race track quickly so the race can resume. When track wrecks occur, fluids from the transmissions, gasoline tanks, engines and the like often spill onto the track creating wet, slick hazardous areas. To prevent additional accidents these areas must be monitored, cleaned and dried before the race can resume. Spilled liquids may consist of water, oil, gasoline, antifreeze, transmission and brake fluids and other liquids. To remedy problem spills, absorbent materials are provided as a fine grain or in powder form to absorb and dry the affected areas. As the granular material is light in weight it tends to blow away or "fly" upon distribution before it contacts the liquid spill, often requiring the spill area to be recoated one or more times with the oil absorbent material. The recoating or redistribution of the oil absorbent material can take additional valuable time from the race and can cause multiple problems and expenses for media, sponsors, track personnel and drivers.

Therefore, based on the problems and disadvantages of conventional clean-up methods employed and standard granular spreaders, the present invention was conceived and one of its objectives is to provide a granular spreader which can be used on a race track which includes a hopper with a pair of flexible, rubber like flaps along the egress to insure proper, efficient distribution methods and techniques.

It is another objective of the present invention to provide a granular spreader which includes a scrubber which can be raised and lowered by an electric winch to assist in the most economical granular spreading.

It is still another objective of the present invention to provide a granular spreader having a small auxiliary side spreader remotely operated and attached to the hopper for precise, accurate granular distribution in particular instances.

It is yet another objective of the present invention to provide a granular spreader which can be easily releasably attached or detached, for example, to a pickup truck and towed or stored as needed.

It is a further objective of the present invention to provide a granular spreader which is easy to operate by a sole truck driver and which will save time and money during use.

It is still a further objective of the present invention to provide a granular spreader and method of use whereby the spreader is joined to a truck and used on race tracks or other surfaces by the vehicle driver, and after use can be removed from the truck and positioned on a customized cart for storage.

Various other objectives and advantages of the present invention will become apparent to those skilled in the art as a more detailed description is set forth below.

SUMMARY OF THE INVENTION

The aforesaid and other objectives are realized by providing a granular spreader having a V-shaped hopper for distribution of oil absorbing granules for use in cleanup of fluid spills on race tracks. The granular spreader is towed by a vehicle such as a pickup truck and can be manually operated by the driver of the vehicle with the use of a cord affixed to a handle on the hopper to release the granules. The hopper is formed by two (2) rectangular panels (front and rear) and two (2) V-shaped side panels and includes an external bracket proximate the top front panel of the hopper for placement over the closed tailgate of the pickup truck and a pair of outwardly extending stops proximate the bottom front panel of the hopper rest on the top of the bumper of the vehicle to maintain the V-shaped granular spreader in a steady position. A hand grip is provided on each side of the hopper for use as needed during handling and maneuvering. A lid with locking handle closes the top of the hopper to cover and maintain the contents therein. Tie straps are affixed to the hopper proximate the bracket on the front panel and are utilized to securely attach the granular spreader to rings in the truck bed of the vehicle to prevent unwanted movement or disconnection of the spreader from the truck during use.

The hopper provides a hollow egress tube along the bottom with a rotatable hollow dispersion tube affixed therein for controlling the release of granule materials within the hopper. The egress tube includes pairs of slots or openings on the top and bottom which are in vertical alignment. The dispersion tube also includes pairs of opposing slots or openings. The egress tube is fixed whereby the top and bottom openings are directed vertically and the opposing pairs of openings of the rotatable inner dispersion tube are aligned whereby the granules contained in the hopper are free to enter the egress tube. Upon manual rotation of the handle the inner dispersion tube rotates whereby the openings of the inner dispersion tube will align with the vertical openings in the egress tube, allowing the granules to flow downwardly from the hopper, through the egress and dispersion tubes and out of the spreader between a pair of flexible flaps.

The handle is maintained with the hopper by use of a handle guide, spring and spring holder. The spring loaded handle is affixed to the inner dispersion tube and can be pivoted to open by pulling an attached cord to align the dispersion tube openings with the egress tube openings so the granules will exit. To stop the flow of granules, the cord is released whereby the spring causes the handle to return to its normal position while rotating the inner dispersion tube to its closed position, preventing further granule flow. The spring holder is affixed to one of the hopper side panels and rear panel while the handle guide is affixed to the same hopper side panel and front panel. The U-shaped handle guide limits the rotation of the handle in either direction thereby controlling the rotation of the dispersion tube within the egress tube. A cord holder is provided proximate the handle on the rear panel of the hopper for maintaining the cord when not in use.

The hopper also includes a series of internal dividers to section and allow for even separation of contained granules. The dividers extend from the top of the hopper to approximately a few inches above the egress and dispersion tubes and assist in maintaining the granules in the hopper somewhat level, while the granular spreader is in use on a sloped surface such as a race track. Due to the unevenness or tilt of a race track, with one side of the track being of higher elevation, should the dividers not be used, the granules tend to slide to the lower side, causing insufficient and unevenness of granule dispersion.

A pair of flexible flaps are affixed to the bottom of the hopper to assist in controlled distribution of the exiting granules and to prevent "fly". The flaps consist of a first short or bottom flap which is affixed proximate the front hopper panel at the egress tube while a second longer or top flap is affixed proximate the rear hopper panel in opposing relation to the bottom flap. The bottom flap is folded back at its terminal end towards the front hopper panel onto itself and attached thereto such as by bolts or the like and includes a metal strip therein for stability which extends almost the full length of the bottom flap. A plurality of strip baffles are mounted at approximately forty-five degrees to the hopper travel direction on the top surface of the bottom flap, below the top flap to provide guidance in the direction of release to the exiting granules for contacting spilled liquids on the track surface. The baffles are affixed through the bottom flap and to the metal strip for added stability. The baffles while assisting in flow direction also insure a space is maintained between the top and bottom flaps for proper granular distribution.

To further assist in granule distribution and to insure the granules absorb spilled liquids, a rotatable scrubber having bristles is affixed rearwardly of the hopper which can be raised and lowered by an electric winch driven by power from the vehicle. The winch is maintained within a closed compartment inside the hopper proximate the top and the winch cable with a hook exits an aperture in the rear panel of the hopper to attach to a D-ring on the top of the scrubber. The winch is remotely operated by the vehicle driver using a wired remote control whereby the scrubber can be lowered so the bristles contact the race track surface to urge the deposited granules into spilled liquids. An adjustable target is moveably affixed to the driver's side of the scrubber so the driver of the vehicle can, for example look in the side mirror and see the target position (up or down) of the scrubber. A pair of chains extend from side rods of the scrubber frame through holes in the top flap and are affixed to the metal strip on the short bottom flap to assist in maintaining the usual position of the flaps and to prevent the flaps from becoming displaced, should the vehicle need to backup during granular spreading. A pair of turnbuckles are attached at one end to the scrubber frame side rods and at the other end to the scrubber to allow for adjusting to change the angular position of the scrubber, such as lengthening or shortening to thereby angle the position of the scrubber relative to the track surface to insure all bristles are flat against the track.

A cart is also provided for storing the granular spreader during periods of non-use and assisting in connecting the spreader to a vehicle for use. The cart comprises a central frame member having a pair of adjustable vertical stanchions movably positioned thereon. Each of the stanchions includes a lower stationary section and an upper movable extension with two (2) pair of arms, one (1) upper pair having two (2) arms and one (1) lower pair having only one (1) arm, for maintaining the hopper when not in use. Each of the pair of upper arms are affixed to the movable stanchion extensions and each of the pair of lower arms are affixed to the stanchion stationary sections. A standard manual screw jack is mounted to each of the stanchion stationary sections for raising and lowering the stanchion extensions while the hopper is maintained in the upper arms as required for convenient attachment or removal from a vehicle tailgate. The upper pair of side arms are formed much wider than the lower pair of side arms to accommodate the V-shape of the hopper. The upper pair of side arms proximate the side of the hopper with the handle are configured differently from the opposing upper pair of side arms to accommodate the extending hopper handle. The stanchions are each slideable horizontally along the central frame member in order to move the stanchions outwardly to release the hopper or inwardly to receive the hopper. Each stanchion includes a tightenable knob for locking the stanchions in place horizontally on the central frame member. The central frame member includes swivel wheels affixed thereto whereby the cart, with or without the granular spreader can be rolled for positioning and storage as needed.

A small conventional auxiliary spreader is also attached to one side of the hopper in opposing relation to the hopper handle and it is motor driven and operated by a wireless remote control. A rotatable disk at the bottom of the auxiliary spreader hopper disperses granules maintained therein to the side. The auxiliary spreader is remotely operated by a wireless hand held control and is utilized such as along the surrounding walls of a race track as needed to assist such as in absorbing unwanted fluids along the track walls which cannot be reached due to spatial requirements of the truck, scrubber and granular spreader.

The method of use comprises the steps of attaching the granular spreader to a truck, filling the hopper with the appropriate granule material for the particular job, towing the granular spreader to the intended job site or area, and lowering the scrubber with the wired remote control to contact the surface. Thereafter the driver urges the dispersion tube slots into alignment with the slots in the egress tube by use of the handle and attached cord to allow the granule material to flow between the flaps onto the intended surface and the truck is driven along the surface such as a race track. The auxiliary spreader may also be remotely activated as needed. After use the granule spreader is removed from the truck and returned to its cart for storage and cleaning as required.

DETAILED DESCRIPTION OF THE PREFERRED EMBODIMENT AND OPERATION OF THE INVENTION

Figure 1:
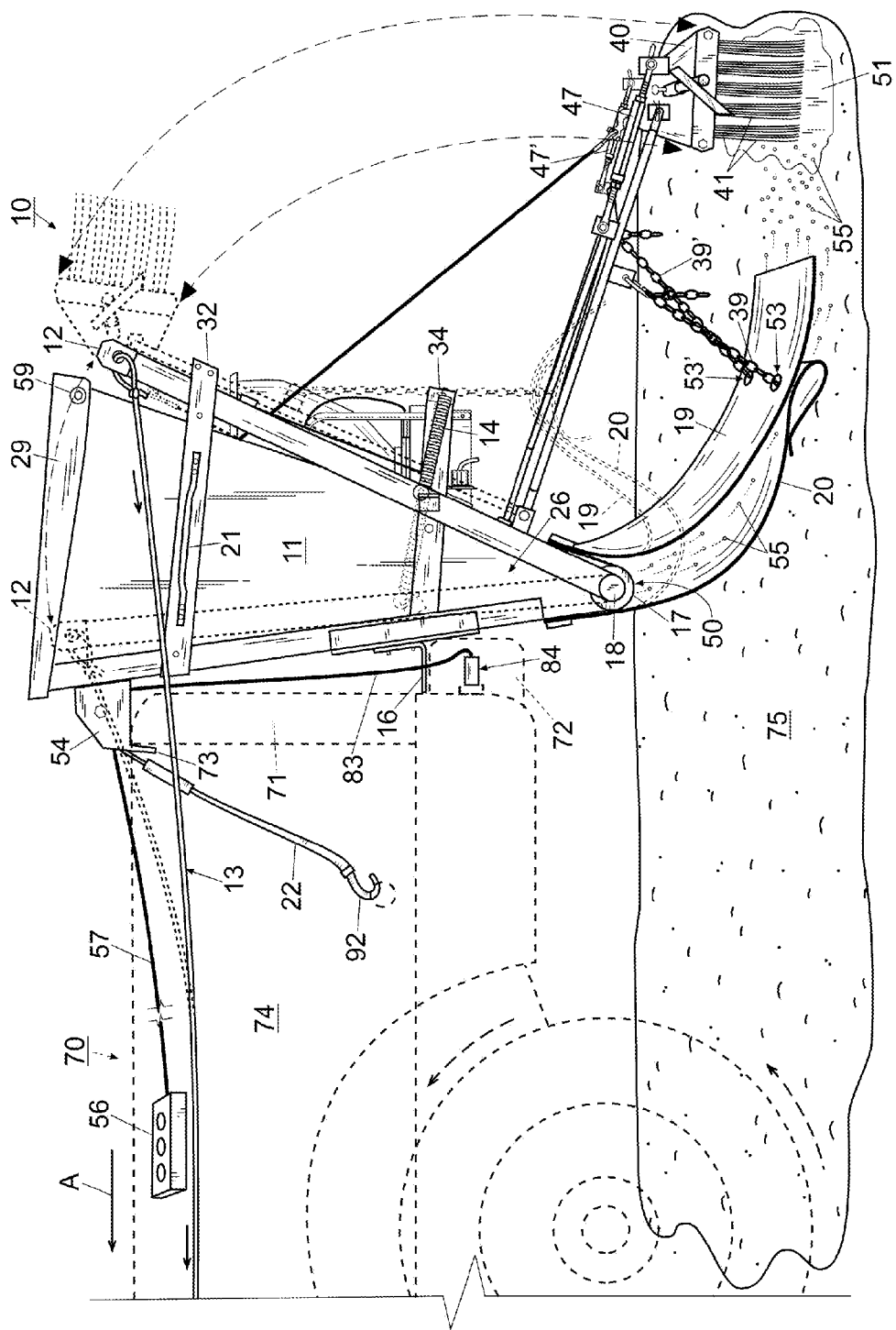
FIG. 1 shows a driver side view of the granular spreader of the invention attached to the tailgate of a conventional pickup truck.

For a better understanding of the invention and its operation, turning now to the drawings, FIG. 1 shows preferred granular spreader 10 affixed to tailgate 71 of conventional pickup truck 70 in schematic representation. Granular spreader 10 is used for surface spreading various types of small, fine particles such as oil absorbents, salt, fertilizers, ground clay and for other materials and purposes as needed. Preferred granular spreader 10 includes V-shaped hopper 11 formed preferably from 0.090 inches (2.28 mm) T-6061 aluminum sheets composed of front panel 24, rear panel 25 and V-shaped side panels 26, 26' as shown in FIGS. 1-4. Lid 29 is also formed from 0.090 inches (2.28 mm) T-6061 aluminum sheets and pivotally affixed to hopper 11 with pins 59 (FIG. 1), 59' (FIG. 3). Hopper 11 has a capacity of 500-800 pounds of granular materials such as a conventional oil absorbent however other granular materials may weigh more or less, depending on the particular material selected.

Hopper 11 provides hollow egress tube 17 affixed along the bottom thereof with rotatable hollow dispersion tube 18 affixed therein for controlling the release of granule materials within hopper 11. Handle 12 is affixed to dispersion tube 18 for rotation thereof. Egress tube 17 which is fixed includes pairs of slots or openings 27 (FIG. 3) on the top and bottom which are in vertical alignment forming egress 50. Dispersion tube 18 includes pairs of opposing slots or openings 28 (FIG. 3). Egress tube 17 is fixed whereby top and bottom openings 27 are directed vertically and opposing pairs of openings 28 of rotatable inner dispersion tube 18 are aligned whereby the granule material contained in hopper 11 is free to enter egress tube 17. Upon manual rotation of handle 12 inner dispersion tube 18 rotates whereby openings 28 align with vertical openings 27 in egress tube 17, allowing the granules to flow downwardly from hopper 11, through dispersion tube 18, egress tube 17 and egress 50 and out of granular spreader 10 between flexible flaps 19 and 20.

In use, granular spreader 10 is removed from cart 60 shown in FIG. 3 and connected to truck 70 as seen in FIG. 1. Hopper 11 includes external L-shaped bracket 15 with lip 73 (FIG. 3) which extends over tailgate 71. Outwardly extending stops 16, 16' affixed to front panel 24 of hopper 11 are supported on bumper 72 as shown in FIG. 1 to assist in maintaining hopper 11 in a steady position. L-shaped bracket 15 is affixed to front panel 24 of hopper 11 and is joined beneath strap supports 54, 54' and central bracket support 58 also shown in FIG. 3. Strap supports 54, 54' allow a secure connection to granular spreader 10 for respectively tie straps 22, 22' having hooks 92, 92' (92' not shown) which connect to standard D-rings within bed 74 of pickup truck 70 (FIG. 1). Standard tie straps 22, 22' can be tightened or released by manipulation of the conventional strap levers shown thereon and assist in the secure connection of granular spreader 10 to pickup truck 70.

Figure 2:
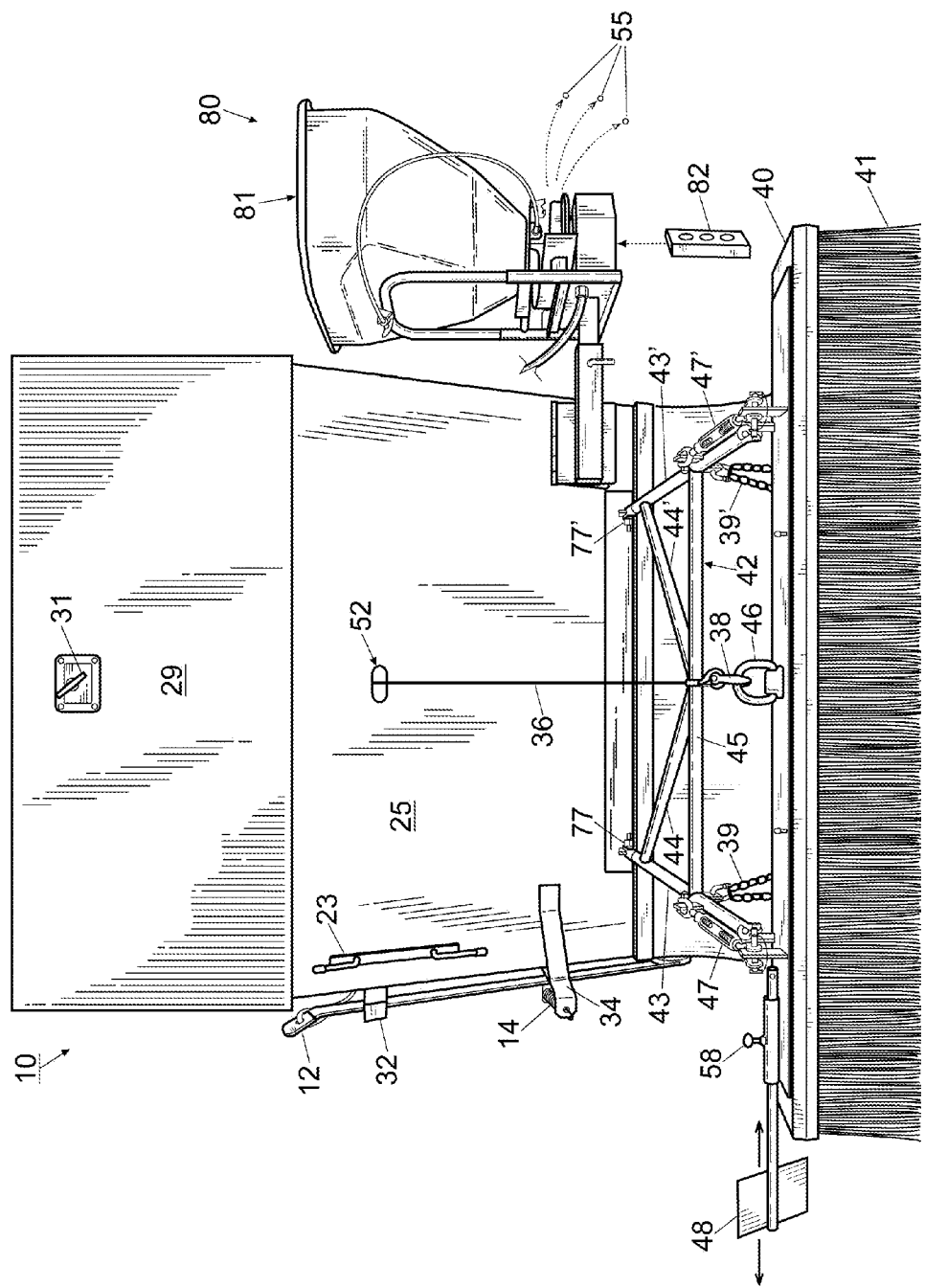
FIG. 2 depicts a rear elevational view thereof.
Figure 3:
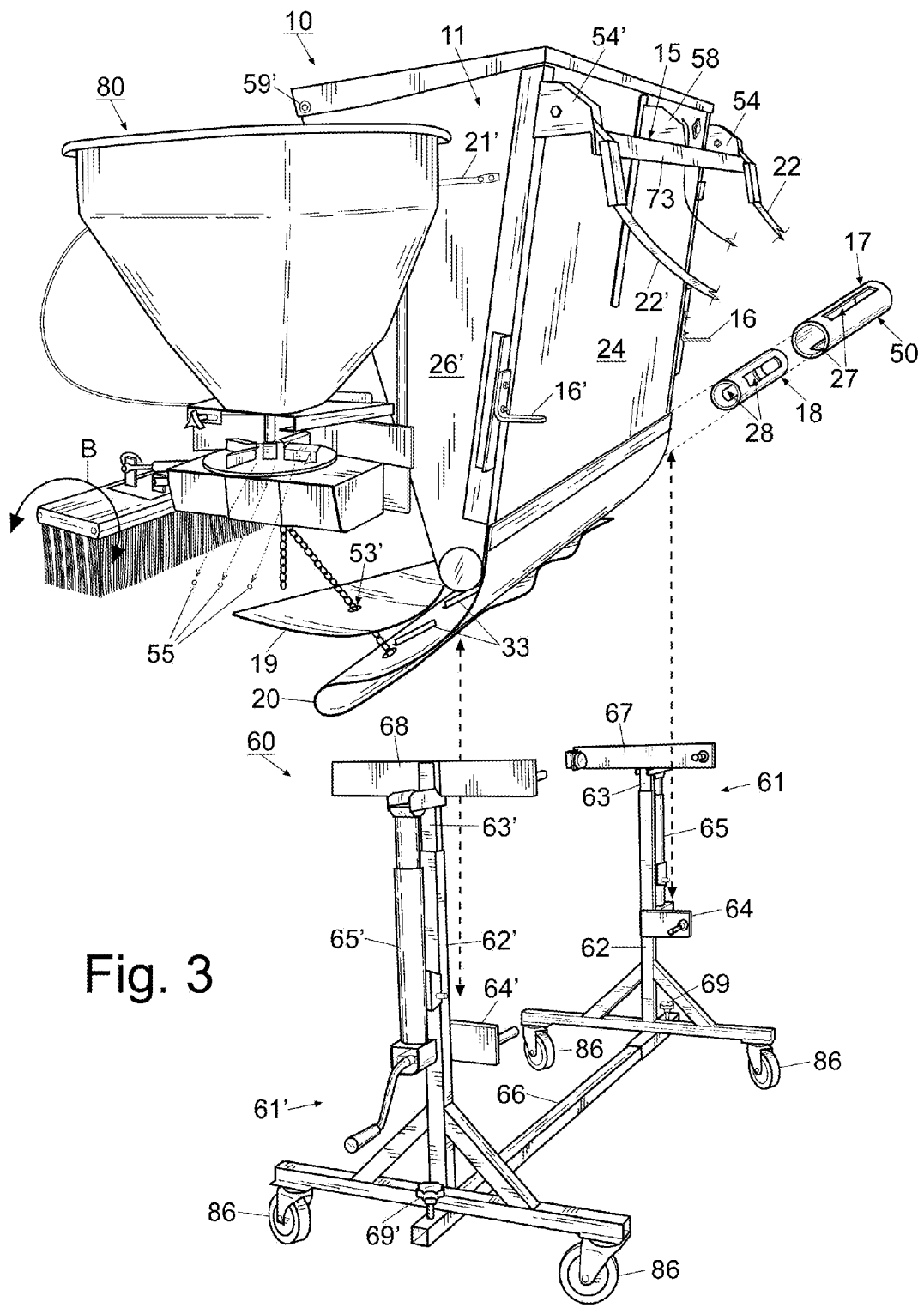
FIG. 3 pictures the granular spreader as detached from the truck and exploded from the cart.
Figure 4:
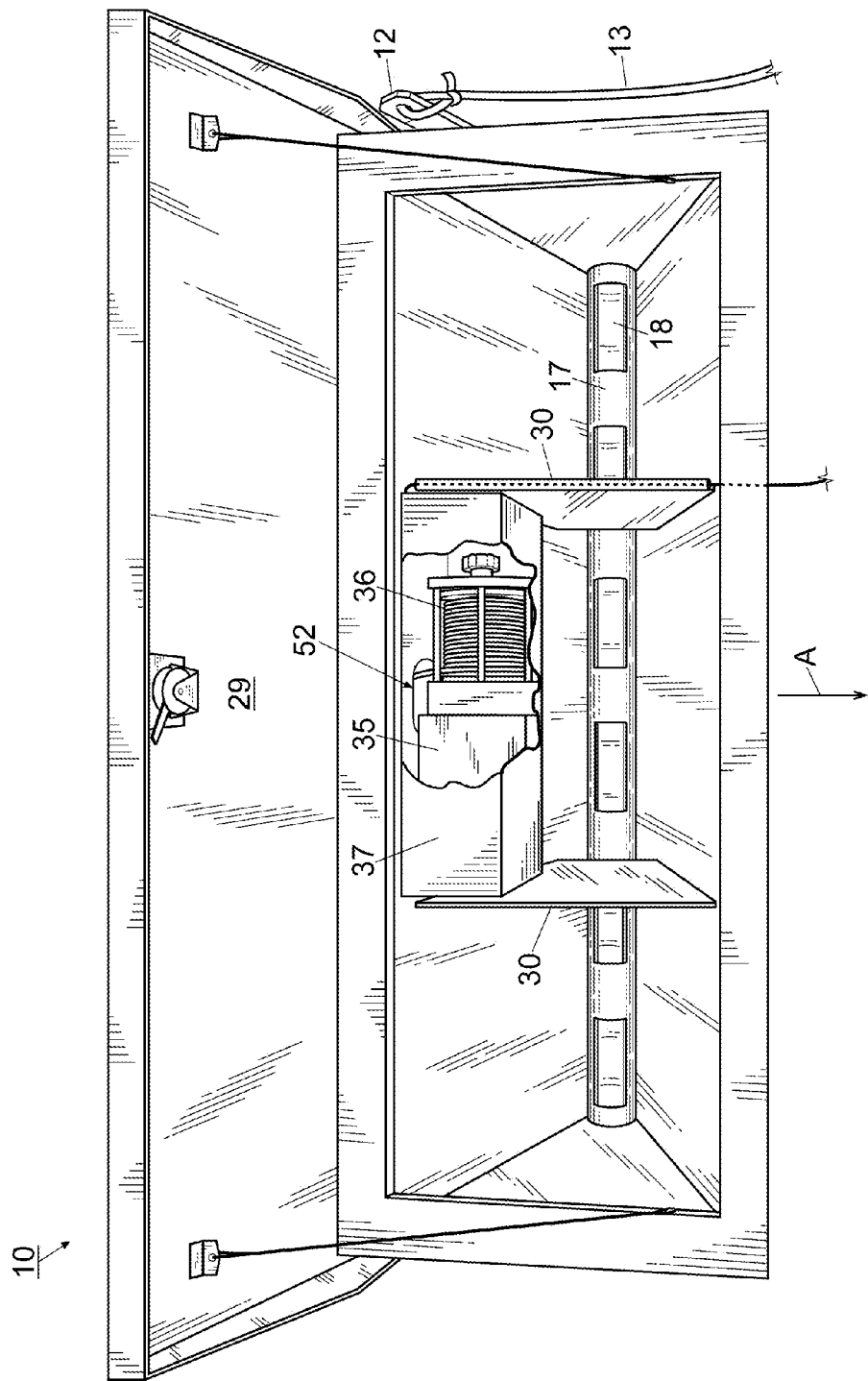
FIG. 4 demonstrates a top view of the granular spreader as removed from the truck and cart with the auxiliary spreader removed and with the hopper lid open.

In use, lid locking handle 31 shown in FIG. 2 is rotated to disengage lid locking handle 31 from the hopper catch (not shown) and lid 29 is manually raised to its upright position as seen in FIG. 4. Granular material such as standard oil absorbent 55 is poured into hopper 11 with handle 12 in its closed posture as also seen in FIG. 1. Hopper 11 also includes a series of internal dividers 30 to section and allow for even separation of granules 55 therein. Dividers 30 extend from the top of hopper 11 to approximately a few inches above egress tube 17 and dispersion tube 18 and assist in maintaining granules 55 in hopper 11 somewhat level, while granular spreader 10 is in use. Once hopper 11 is filled, lid 29 is lowered and lid locking handle 31 is rotated to engage handle 31 with the hopper catch (not shown) to lock lid 29 in place with hopper 11.

Hopper 11 includes handle 12 which is joined such as by welding to dispersion tube 18 shown schematically in FIG. 3 and can be rotated by pulling handle cord 13, generally by the driver (not shown) of pickup truck 70. Handle 12 is further maintained with hopper 11 by handle guide 32, spring 14 and spring holder 34. Handle guide 32 is affixed to side panel 26 and front panel 24 and limits the rotation of handle 12 in either direction thereby controlling the rotation of dispersion tube 18. Spring holder 34 is affixed to side panel 26 and rear panel 25. Spring 14 is joined to spring holder 34 and handle 12 whereby handle 12 is biased in its closed posture. By pulling cord 13 towards the cab of pickup truck 70, handle 12 is rotated thus rotating dispersion tube 18 within egress tube 17 and allowing opposing dispersion slots 28 (FIG. 3) to align with opposing egress slots 27 whereby granular materials 55 in hopper 11 will pass downwardly through dispersion tube slots 28, egress tube slots 27 and egress 50 to exit hopper 11 such as seen in FIG. 1. When cord 13 is released, spring 14 urges handle 12 to its rearward or closed position (FIG. 1) thus rotating dispersion tube 18 causing dispersion tube slots 28 to return to a normal orientation relative to egress tube slots 27 thereby stopping the flow of granular material 55. Thus by rotating dispersion tube 18 opposing slots 28 are coincidentally aligned with egress tube slots 27 to allow granular flow through egress (seen generally in FIG. 1) from hopper 11. Cord holder 23 may be provided proximate handle 12 on rear panel 25 of hopper 11 for maintaining cord 13 when not in use as seen in FIG. 2.

Flaps 19 and 20 are flexible and preferably formed from a ¼" (6.35 cm) by 36" (91.44 cm) Nyracord™ from Koneta, Inc. of Wapakoneta, Ohio 45895 as part: 802536 ¼"×36" Nyracord, smooth top-bottom REF2304. Flaps 19 and 20 extend the width of hopper 11, preferably about 60" (152.4 cm) as shown, bottom flap 20 is affixed to the bottom of front panel 24 while top flap 19 is affixed to the bottom of rear panel 25, both proximate egress tube 17. Flaps 19 and 20 assist in controlled distribution by directing granules 55 to surface 75 such as shown in FIG. 1 which is a race track. The driver (not shown) of pickup truck 70 would proceed in the direction of travel as seen by arrow A in FIGS. 1 and 4 along race track surface 75 until an oily or wet spot is located during a race intermission. Upon arrival at the wet or oily area, scrubber 40 is lowered by operating winch 35 (FIG. 4) with remote 56 and cord 13 is pulled thereby urging handle 12 to a forward or open position and allowing granules 55 to exit egress 50 of hopper 11. Scrubber 40 previously lowered to an active position touches track surface 75 and granules 55 that are dispersed thereon to insure a scouring, oil absorbing effect. The driver or operator manipulates remote 56 to raise or lower scrubber 40 with bristles 41 thereon as needed. Scrubber 40 is a conventional broom-like head, sold by Trynex International of Warren, Mich. 48089 as part: MOD USB060 60" Valuesweep Broom.

Bottom flap 20 is folded beneath at its terminal end towards front panel 24 onto itself and attached thereto such as by bolts (not shown) or the like and includes a metal strip (not shown) therein for stability which extends almost the full length of bottom flap 20. A plurality of metal strip baffles 33 (FIG. 3) are mounted at approximately forty-five degrees to the hopper travel direction on the top surface of bottom flap 20, below top flap 19 to provide guidance in the direction of release to exiting granules 55 for contacting spilled liquids on track surface 75. Baffles 33 are affixed through bottom flap 20 and to the metal strip (not shown) for added stability. Baffles 33 while assisting in flow direction also insure a space is maintained between top and bottom flaps 19, 20 for proper distribution of granular material 55.

Scrubber 40 is affixed to hopper 11 by scrubber frame 42 as shown in FIGS. 1 and 2 with pivot pins 77, 77'. Scrubber frame includes side rods 43, 43', transverse rod 45 and angle support rods 44, 44' which are affixed on one end such as by welding to transverse rod 45 and at the opposite ends to side rods 43, 43' respectively. As further shown turnbuckles 47, 47' are connected to scrubber 40 to adjust the angle thereof such as seen by arrow B in FIG. 3 to track surface 75. The angle of scrubber 40 to track surface 75 can be changed by lengthening or shortening turnbuckles 47, 47' simultaneously, depending on the particular surface, surface angle and other conditions so scrubber 40 will be parallel to track surface 75 at its lowered position. Target 48 is slidably connected to scrubber 40 and can be adjusted inwardly and outwardly by loosening thumb screw 58 and secured in a desired position by tightening thumb screw 58. Target 48 allows the pickup truck driver to view the position (up or down) of scrubber 40 as hopper 11 normally would block the driver's view of scrubber 40. Target 48 can be urged inwardly against the edge of scrubber 40 when not in use and secured with thumb screw 58.

Electric winch 35 is sealed within hopper 11 proximate the top thereof and includes closed housing 37 which prevents contamination of winch 35 from granular materials. Electric winch 35 is preferably WarnWorks® 1700 Utility Winch from Warn Industries, Inc. of Clackamas, Oreg. 97015-8903 as part No.: 651700. Opening 52 in rear panel 25 as shown in FIGS. 2 and 4 allows winch cable 36 with hook 38 to exit therefrom and connect with scrubber 40 as winch hook 38 engages D-ring 46 thereon. Winch 35 is a conventional electric winch powered by 12V DC supplied through power line 83 which is connected through vehicle power outlet 84 as shown in FIG. 1. The operator or vehicle driver can manipulate winch remote control 56 joined to electrical conductor 57 as shown in FIG. 1 to raise and lower scrubber 40. Scrubber 40 is hingedly joined to hopper 11 as shown in FIG. 2 as scrubber frame side rods 43, 43' are pivotally affixed to rear panel 25 by respectively pivot pins 77, 77'. A pair of chains 39, 39' extend from side rods 43, 43' respectively of scrubber frame 42 through holes or openings 53, 53' (FIG. 1) respectively in top flap 19 and are affixed to a metal strip (not shown) on bottom flap 20 to assist in maintaining the usual position of flaps 19, 20 and to prevent flaps 19, 20 from becoming displaced, should vehicle 70 need to backup during granular spreading. As chains 39, 39' are affixed to side rods 43, 43' of scrubber frame 42, upon lifting and lowering scrubber 40, flaps 19 and 20 are likewise lifted or lowered such as seen in dotted line fashion in FIG. 1. Chains 39, 39' may be adjustably lengthened or shortened as needed to accommodate the height of a particular truck utilized for towing granular spreader 10 such that upon lowering scrubber 40, flaps 19 and 20 are at an optimum level with surface 75 to provide controlled disbursement of granular material 55.

It may be necessary during race intermission to disperse oil absorbing or other granular materials to areas that are difficult to contact and reach using hopper 11 with scrubber 40. In such cases, small auxiliary spreader 80 having hopper 81 shown in FIGS. 2 and 3 can be effective and is attached to one side of hopper 11 in opposing relation to handle 12. Auxiliary spreader 80 is powered by 12V DC current as is winch 35 from 12V DC through vehicle power outlet 84 such as by using a "Y" connector (not shown) with power outlet 84. Conventional auxiliary spreader 80 can be purchased from Trynex International of Warren, Mich. 48089 as part: MOD SR-110 3.0 Cu. ft. wireless spreader. Auxiliary spreader 80 disperses granules 55 from hopper 81 to the side of hopper 11 such as for example, closely along the inside of a slanted race track wall where pickup truck 70 and hopper 11 with scrubber 40 cannot accommodate. Auxiliary spreader 80 is operated by wireless remote control 82 (FIG. 2), generally used by the driver (not shown) of pickup truck 70.

Cart 60 is provided for storing granular spreader 10 during periods of non-use and assisting in connecting spreader 10 to a vehicle such as vehicle 70. Hand grips 21, 21' are provided on each side of hopper 11 for use as needed during handling and maneuvering. Hand grip 21 is affixed to handle guide 32 while hand grip 21' is affixed to side panel 26'. As seen in FIG. 3, cart 60 comprises central frame member 66 having a pair of adjustable vertical stanchions 61, 61' movably positioned thereon. Each of stanchions 61, 61' includes respectively lower stationary sections 62, 62' and upper movable extensions 63, 63' with respectively two (2) pair of arms, one (1) upper pair 67, 68 and one (1) lower pair 64, 64', for maintaining granular spreader 10 when not in use. A standard manual screw jack 65, 65' is mounted to each of stanchion stationary sections 62, 62' respectively for raising and lowering stanchion extensions 63, 63' while hopper 11 is maintained in upper arms 67, 68 as required for convenient attachment or removal from a vehicle tailgate. The upper pair of side arms 67 proximate side 26 with handle 12 are configured differently from the opposing upper pair of side arms 68 to accommodate extending hopper handle 12. The lower pair of arms 64, 64' each include only one (1) arm. Each stanchion 61, 61' includes respectively tightenable knob 69, 69' for locking stanchions 61, 61' respectively in place horizontally on central frame member 66. Cart 60 includes swivel wheels 86 affixed thereto whereby cart 60, with or without granular spreader 10 can be rolled for positioning and storage as needed.

In use, cart 60 with granular spreader 10 thereon is rolled and situated proximate pickup truck 70 whereby jack stands 65, 65' are manually cranked to raise and lift movable extensions 63, 63' with granular spreader 10 held within arms 67, 68 upwards such that lip 73 of bracket 15 is higher than tailgate 71. Hand grips 21, 21' are then utilized to lift and maneuver granular spreader 10 to place bracket 15 with lip 73 over tailgate 71 whereby stops 16, 16' rest on bumper 72. Cart 60 can then be moved and power line 83 with power outlet 84 affixed to vehicle 70. Tie straps 22, 22' affixed to truck bed 74 as earlier discussed and remote control 56 and cord 13 extended to the cab (not shown) of truck 70 for use by the driver (not shown). Wireless remote control 82 for hopper 81 is likewise moved to the cab (not shown) of truck 70 for use by the driver (not shown) and the power supply (not shown) likewise affixed as earlier described whereby granular spreader 10 is ready for use. As would be understood adjustments may be made to chains 39, 39' and scrubber 40 to insure the placement of flaps 19, 20 and the angle of scrubber 40 proximate the surface granular spreader 10 is utilized on. The steps are reversed to remove granular spreader 10 from truck 70 and return to cart 60.

The method of use of granular spreader 10 comprises the steps of attaching granular spreader 10 to a truck such as pickup truck 70, filling hopper 11 with the appropriate granule material such as granules 55, towing granular spreader 10 to the intended spill site or area such as liquid spill area 51, and lowering scrubber 40 with wired remote control 56 to contact track surface 75. Thereafter the driver urges dispersion tube slots 28 of dispersion tube 18 into alignment with slots 27 in egress tube 17 by use of handle 12 and attached cord 13 to allow granule material 55 to flow between flaps 19, 20 onto liquid spill area 51 on track surface 75 as truck 70 is driven along track surface 75. Auxiliary spreader 80 may also be remotely activated as needed to disperse granules 55 to the side. After use granule spreader 10 is removed from truck 70 and returned to cart 60 for storage and cleaning as required.

The illustrations and examples provided herein are for explanatory purposes and are not intended to limit the scope of the appended claims.

I claim:

1. A Granular spreader for attachment to a vehicle comprising:
   a hopper, said hopper defining an egress;
   a first flexible flap;
   a second flexible flap, each of said first and second flaps attached to said hopper and extending along said egress the width thereof in opposing relation to allow granular material from said egress to pass therebetween during spreading;
   a scrubber, said scrubber affixed to said hopper, a target, said target selectively slideable along said scrubber, said scrubber being pivotally joined to said hopper; and
   a winch positioned on said hopper, said winch connected to said scrubber to raise and lower said scrubber.

2. The granular spreader of claim 1 further comprising an auxiliary spreader, said auxiliary spreader connected to said hopper.

3. The granular spreader of claim 1 further comprising a remote, said remote connected to said winch for operating the same.

4. The granular spreader of claim 1 further comprising a handle, a dispersion tube, said handle affixed to said dispersion tube to rotate said dispersion tube, said dispersion tube mounted proximate said egress.

5. The granular spreader of claim 1 wherein said hopper is V-shaped.

6. The granular spreader of claim 1 further comprising a scrubber frame, said scrubber frame attached to said hopper and to said scrubber.

7. The granular spreader of claim 1 further comprising a chain, said chain attached to said first flap for lifting the same.

8. The granular spreader of claim 7 wherein said second flap defines an opening, said chain passing through said opening.

9. The granular spreader of claim 6 further comprising a chain, said chain attached to said scrubber frame.

10. A granular spreader for attachment to a vehicle comprising: a V-shaped hopper, said hopper defining an egress, a first flexible flap, a second flexible flap, each of said first and second flaps attached to said hopper and extending along said egress the width thereof in opposing relation to allow granular material from said egress to pass therebetween during granular spreading, a scrubber, said scrubber pivotally affixed to said hopper, a target, said target selectively slideable along said scrubber, a winch, said winch positioned on said hopper, said winch connected to said scrubber to raise and lower said scrubber, a remote, said remote connected to said winch, an auxiliary spreader, said auxiliary spreader connected to said hopper, a handle, a dispersion tube, said handle affixed to said dispersion tube to rotate said dispersion tube, said dispersion tube mounted proximate said egress.

11. The granular spreader of claim 10 further comprising a cart frame, a pair of adjustable side stanchions, said pair of side stanchions attached to said cart frame, a pair of side arms, one each of said pair of side arms affixed to one each of said pair of side stanchions, said pair of side arms supporting said hopper, a jack, said jack attached to one of said pair of side stanchions for raising said hopper, two pairs of wheels, each of said pairs of wheels attached to said frame.

* * * * *